United States Patent
Ma et al.

(10) Patent No.: US 12,524,877 B2
(45) Date of Patent: Jan. 13, 2026

(54) NONDESTRUCTIVE REAL-TIME TEST AND DETECTION OF GALL-FORMING PLANT-PARASITIC NEMATODES

(71) Applicant: Sam Houston State University, Huntsville, TX (US)

(72) Inventors: Junkun Ma, Spring, TX (US); Autumn Smith-Herron, Huntsville, TX (US); Faruk Yildiz, Spring, TX (US); Recayi Pecen, Cypress, TX (US)

(73) Assignee: Sam Houston State University, Huntsville, TX (US)

( * ) Notice: Subject to any disclaimer, the term of this patent is extended or adjusted under 35 U.S.C. 154(b) by 202 days.

(21) Appl. No.: 18/397,358

(22) Filed: Dec. 27, 2023

(65) Prior Publication Data
US 2024/0212141 A1 Jun. 27, 2024

Related U.S. Application Data

(60) Provisional application No. 63/477,322, filed on Dec. 27, 2022.

(51) Int. Cl.
*G06T 7/00* (2017.01)
*G06T 7/11* (2017.01)
(Continued)

(52) U.S. Cl.
CPC .............. *G06T 7/0012* (2013.01); *G06T 7/11* (2017.01); *G06T 7/174* (2017.01); *G06V 20/188* (2022.01);
(Continued)

(58) Field of Classification Search
CPC . G06T 2207/30004; G06T 2207/30188; G06T 7/0012; G06T 7/11; G06T 7/174;
(Continued)

(56) References Cited

U.S. PATENT DOCUMENTS

| | | | |
|---|---|---|---|
| 10,259,549 B2 * | 4/2019 | Lambertus | B63B 27/19 |
| 2011/0098530 A1 * | 4/2011 | Yamane | A61B 1/042 |
| | | | 600/109 |

(Continued)

*Primary Examiner* — Peter D Le
(74) *Attorney, Agent, or Firm* — KOWERT, HOOD, MUNYON, RANKIN & GOETZEL, P.C.; Gareth M. Sampson

(57) ABSTRACT

A non-destructive real-time plant root imaging and analysis system to detect gall-forming plant-parasitic nematodes is disclosed. The system includes a root imaging device based on a minirhizotron concept with customizations and additions such that it can be inserted into the soil in the vicinity of a plant root and subsequently take images of the plant root system at multiple positions and angles. The device includes a movable base equipped with a high-resolution digital camera module integrated into the transparent tube of a minirhizotron, allowing images of the host plant root at different depths to be taken when the base travels within the transparent tube. A set of image processing algorithms are developed and integrated into a custom-designed graphic user interface (GUI) to analyze and detect these nematodes' presence automatically. The algorithms may stitch the images taken to obtain a panoramic view of the entire plant root system.

20 Claims, 14 Drawing Sheets

(51) Int. Cl.
  *G06T 7/174*     (2017.01)
  *G06V 20/10*     (2022.01)
  *H04N 7/18*      (2006.01)
  *H04N 23/56*     (2023.01)
  *H04N 23/698*    (2023.01)
(52) U.S. Cl.
  CPC ............ *H04N 7/185* (2013.01); *H04N 23/56* (2023.01); *H04N 23/698* (2023.01); *G06T 2207/30004* (2013.01); *G06T 2207/30188* (2013.01)
(58) Field of Classification Search
  CPC ...... G06V 20/188; H04N 23/50; H04N 23/56; H04N 23/57; H04N 23/60; H04N 23/698; H04N 7/185
  See application file for complete search history.

(56) References Cited

U.S. PATENT DOCUMENTS

| | | | |
|---|---|---|---|
| 2012/0220870 A1* | 8/2012 | Gambhir | B82Y 30/00 600/431 |
| 2012/0295791 A1* | 11/2012 | Nagasawa | A01N 37/30 504/284 |
| 2016/0097656 A1* | 4/2016 | Arumugam | G01S 1/08 324/207.17 |
| 2016/0318456 A1* | 11/2016 | Moenig | G06V 10/147 |
| 2020/0045953 A1* | 2/2020 | Serrat | A01M 7/0042 |
| 2021/0003534 A1* | 1/2021 | Lal | G06F 3/0416 |
| 2022/0256832 A1* | 8/2022 | Serrat | B05B 12/16 |
| 2022/0289640 A1* | 9/2022 | Layton | C05G 5/40 |
| 2023/0132136 A1* | 4/2023 | Nguyen | A01G 7/00 348/135 |

* cited by examiner

```
┌─────────────────────────────────────────────────────────────┐
│ Moving a camera module positioned in a transparent tube to  │
│ a first specified depth in the transparent tube with a      │
│ linear actuator, wherein the transparent tube is positioned │
│ in soil near a root of a plant                              │
│ 2102                                                        │
└─────────────────────────────────────────────────────────────┘
                              │
                              ▼
┌─────────────────────────────────────────────────────────────┐
│ Capturing multiple images of the plant root at the first    │
│ specified depth where the multiple images include images    │
│ captured at multiple angles relative to the plant root      │
│ 2104                                                        │
└─────────────────────────────────────────────────────────────┘
                              │
                              ▼
┌─────────────────────────────────────────────────────────────┐
│ Storing the images captured at the first specified depth in │
│ a memory coupled to the camera module                       │
│ 2106                                                        │
└─────────────────────────────────────────────────────────────┘
                              │
                              ▼
┌─────────────────────────────────────────────────────────────┐
│ Moving the camera module to a second specified depth in the │
│ transparent tube with the linear actuator                   │
│ 2108                                                        │
└─────────────────────────────────────────────────────────────┘
                              │
                              ▼
┌─────────────────────────────────────────────────────────────┐
│ Capturing multiple images of the plant root at the second   │
│ specified depth where the multiple images include images    │
│ captured at multiple angles relative to the plant root      │
│ 2110                                                        │
└─────────────────────────────────────────────────────────────┘
                              │
                              ▼
┌─────────────────────────────────────────────────────────────┐
│ Assembling the captured images into a panoramic image of    │
│ the environment surrounding the transparent tube            │
│ 2112                                                        │
└─────────────────────────────────────────────────────────────┘
                              │
                              ▼
┌─────────────────────────────────────────────────────────────┐
│ Identifying portions of the plant root in the panoramic     │
│ image                                                       │
│ 2114                                                        │
└─────────────────────────────────────────────────────────────┘
```

*FIG. 21*

NONDESTRUCTIVE REAL-TIME TEST AND DETECTION OF GALL-FORMING PLANT-PARASITIC NEMATODES

PRIORITY CLAIM

This application claims the benefit of priority to U.S. provisional application Ser. No. 63/477,322, titled "NONDESTRUCTIVE REAL-TIME TEST AND DETECTION OF GALL-FORMING PLANT-PARASITIC NEMATODES", filed Dec. 27, 2022.

BACKGROUND

1. Field of the Invention

The disclosed embodiments generally relate to systems and methods used for capturing images of plant roots. Specific embodiments relate to capturing images of plant roots and determining whether nematodes are forming on the plant roots.

2. Description of the Relevant Art

Plant-parasitic nematodes, especially cyst nematodes, can be problematic within the nursery industry. For instance, cyst nematodes may reduce seedling and plant production whereas the nursery industry prefers to obtain maximum seedling and have continuous plant production. Once established in a nursery setting, cyst nematodes can negatively affect many crops of agricultural importance through the nursery trade since a nursery provides the ideal environment for reproduction and dispersal of cysts and adult females. Once nematodes become established in a nursery setting, are sold for planting, and established in the ground, soil nematodes can become widely dispersed by many factors, including machinery, handheld planting equipment, movement via shoes and clothing, the movement of soil, and many other mechanisms. In addition, plant-parasitic nematodes are difficult to diagnose via visual inspection of the roots or by host plant symptoms while more accurate molecular/laboratory diagnostics are typically time-consuming and costly. Thus, there is a need to develop new innovative ways and equipment to detect cyst nematodes in nursery and agricultural settings. The benefits of developing a rapid diagnostic tool are that it can achieve early detection by inspecting and monitoring plant root conditions throughout the plant growth cycle and quickly mitigating an outbreak by providing early notifications.

A common low-cost device and method for plant root imaging is called a minirhizotron. Examples of a minirhizotron are found in Svane, S. F., Dam, E. B., Carstensen, J. M., & Thorup-Kristensen, K. (2019). A multispectral camera system for automated minirhizotron image analysis. *Plant and Soil*, 441(1-2), 657-672 and Rahman, G., Sohag, H., Chowdhury, R., Wahid, K. A., Dinh, A., Arcand, M, & Vail, S. (2020). SoilCam: A Fully Automated Minirhizotron using Multispectral Imaging for Root Activity Monitoring. *Sensors*, 20(3), 787, both of which are incorporated by reference as if fully set forth herein. In the minirhizotron, transparent tubes are buried into the soil and digital cameras are inserted into the tubes to take images of the plant root system surrounding the tubes. While these portable devices provide improved plant root analysis, further developments are needed to generate more reliable, safer (e.g., less damaging to the plant), and higher functioning devices.

BRIEF DESCRIPTION OF THE DRAWINGS

Embodiments disclosed herein are not limited to any specific devices. The drawings described herein are for illustration purposes only and are not intended to limit the scope of the embodiments.

FIG. 21 is a flow diagram illustrating a method for identifying portions of a plant root, according to some embodiments.

Figure 1:
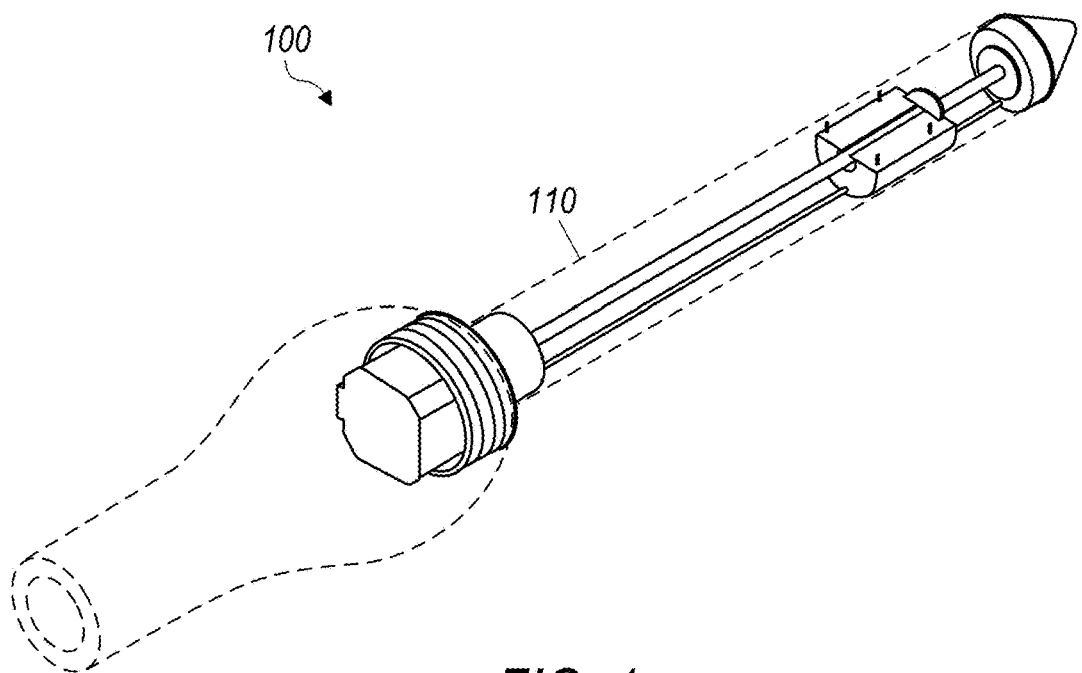
FIG. 1 is an illustration of a CAD model of a minirhizotron, according to some embodiments.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Reciting in the appended claims that an element is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z). In some situations, the context of use of the term "or" may show that it is being used in an exclusive sense, e.g., where "select one of x, y, or z" means that only one of x, y, and z are selected in that example.

In the following description, numerous specific details are set forth to provide a thorough understanding of the disclosed embodiments. One having ordinary skill in the art, however, should recognize that aspects of disclosed embodiments might be practiced without these specific details. In some instances, well-known, structures, computer program instructions, and techniques have not been shown in detail to avoid obscuring the disclosed embodiments.

DETAILED DESCRIPTION OF THE PREFERRED EMBODIMENTS

The present disclosure presents further enhancements of a portable device for imaging plant roots. The disclosed device is self-sustaining and suitable for extended field and nursery deployment. The disclosed device is also equipped with wireless communication and network capabilities allowing remote access and control. A web-browser based graphic user interface (GUI) is also disclosed. The GUI allows users to operate the disclosed device while deployed in agricultural or nursery settings. Functions, including taking plant root images, storing the images on the device or selected cloud, and applying the image processing algorithm to analyze images stored on the cloud or downloaded to local storage devices to detect cysts on the images, are integrated into the GUI. The disclosed device can also be scaled up to create a national or international network.

Various embodiments of a non-destructive real-time plant root imaging and analysis system to detect gall-forming plant-parasitic nematodes are disclosed. The system includes a root imaging device based on the minirhizotron concept with customizations and additions so that it can be inserted into the soil in the vicinity of a plant root and subsequently take images of the plant root system. In various embodiments, a movable base equipped with a high-resolution digital camera module is integrated into the transparent tube of the minirhizotron, allowing images of the host plant root at different depths to be taken when the base travels within the transparent tube. These images may be saved as JPEG format files, stored locally on the controller, and/or in selected cloud storage spaces. A set of image processing algorithms are also developed and integrated into a custom-designed graphic user interface (GUI) to analyze and detect the nematodes' presence automatically. The algorithms stitch the images taken to obtain a panoramic view of the entire plant root system, distinguish plant roots and galls, if there are any, from the surrounding soils, and highlight suspected galls on the images attached to the plant root system.

In various embodiments, the plant root imaging and analysis system may have two different configurations. In a first configuration, the minirhizotron is paired with a portable device equipped with a single board computer (SBC), battery to power both the portable controller and the minirhizotron, storage space for image files, and all control software. A touch screen and GUI with all operation and analysis functions embedded in the controller are used to perform all functions. In a second configuration, the minirhizotron is powered by a photovoltaic (PV) solar power module (such as disclosed in Proppe, D. S., Pandit, M. M., Bridge, E. S., Jasperse, P., & Holwerda, C (2020) Semi-portable solar power to facilitate continuous operation of technology in the field. *Methods in Ecology and Evolution*, 11(11), 1388-1394, which is incorporated by reference as if fully set forth herein).

Second configuration devices may be deployed at selected locations for extended periods. In some embodiments, the second configuration minirhizotron is equipped with a wireless communication module either through Wi-Fi (where it is available) or the Global System for Mobile (GSM) cellular network so that it can be connected to the internet (e.g., following a schematic presented by Raguvaran, K., & Thiyagarajan, J (2015, February). Raspberry PI based global industrial process monitoring through wireless communication. In 2015 *International Conference on Robotics, Automation, Control and Embedded Systems (RACE)* (pp. 1-6). IEEE or various GIS applications offered by Kolios, S., Vorobev, A. V., Vorobeva, G., & Stylios, C. (2017). GIS and environmental monitoring. *Applications in the marine, atmospheric and geomagnetic fields*. Cham, Switzerland: Springer International Publishing AG, both of which are incorporated by referenced as if fully set forth herein).

Authorized users may access these deployed devices via a web browser-based GUI remotely and control them to take and send images of the plant root systems to cloud storage spaces for further image processing, which is also integrated into the GUI.

Various disclosed embodiments describe novel methods and innovative devices that allow users to capture images of root systems of plants potentially infected with gall-forming parasitic nematodes without damaging the plants. Algorithms designed to analyze these images for the detection of these nematodes automatically are also disclosed. Certain embodiments describe three main concepts: a portable controller and minirhizotron, a field-deployable minirhizotron with wireless network connection capability controlled by a web browser-based GUI, and image processing algorithms for automatic detection. The system is built based on minirhizotron devices that can be inserted into the soil in the vicinity of plant roots and subsequently take images of these roots. The minirhizotron devices are equipped with a high-resolution digital camera mounted on a base secured to a linear actuator with a threaded shaft. By controlling the movement of the linear actuator, the base and thus the camera can be positioned precisely in the transparent tube. In certain embodiments, a photoresistor is used to control the initial position of the base and an LED light is used for illumination when taking a photo.

Figure 2:
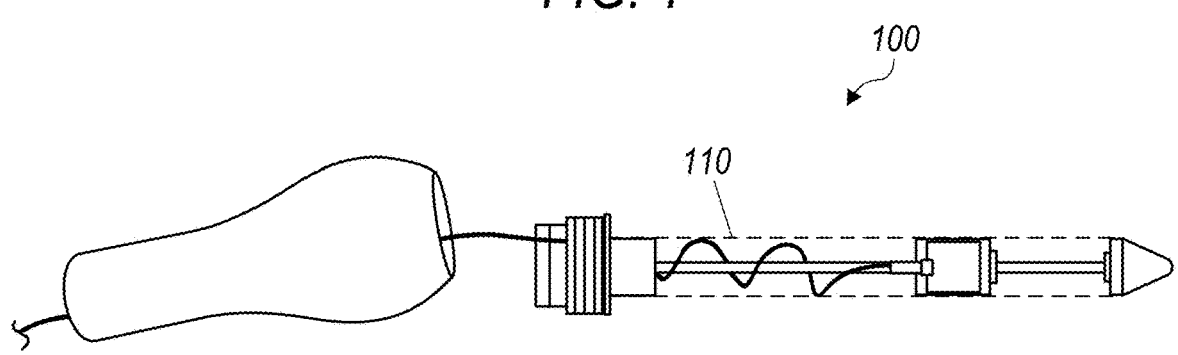
FIG. 2 illustrates a disassembled minirhizotron, according to some embodiments.

FIG. 1 is an illustration of a CAD model of a minirhizotron 100, according to some embodiments. FIG. 2 illustrates a disassembled minirhizotron 100, according to some embodiments. In the illustrated embodiments, minirhizotron 100 includes a polycarbonate tube 110. Tube 110 may have a 1⅜" inner diameter (ID), 1½" outer diameter (OD), and 1/16" wall thickness to form the body of minirhizotron 100. In some embodiments, tube 110 is cut to match the length of the integrated threaded shaft of linear actuator 120. Accordingly, linear actuator 120 has proximal and distal ends matching the ends of tube 110 (the proximal end being where the linear actuator enters the tube). In certain embodiments, tube 110 is a transparent tube.

Figure 3:
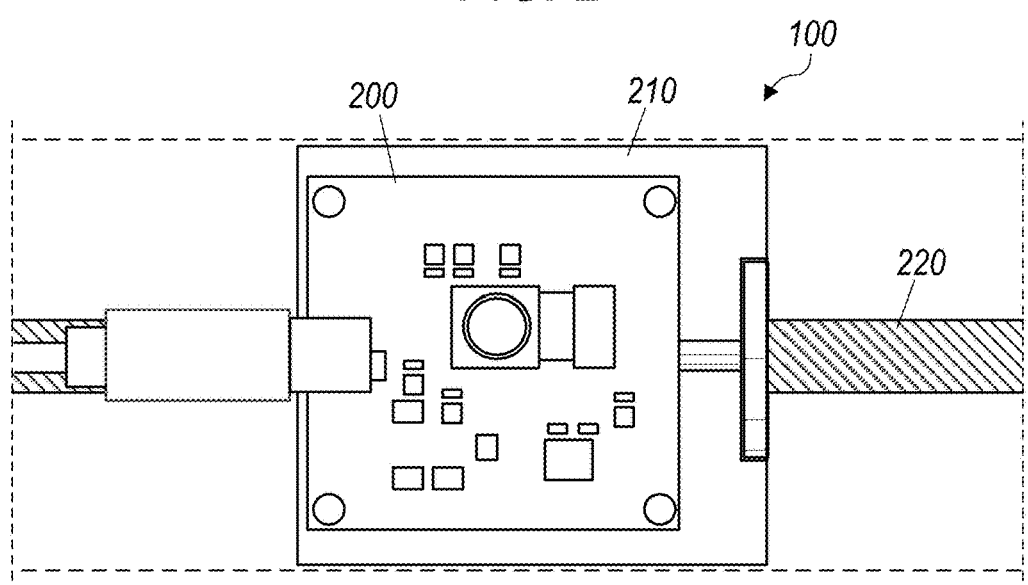
FIG. 3 illustrates a camera module mounted on a base in a minirhizotron, according to some embodiments.

FIG. 3 illustrates a camera module mounted on a base in minirhizotron 100, according to some embodiments. In the illustrated embodiment, camera module 200 is mounted on base 210, which is attached to the threaded shaft 220 of a linear actuator (e.g., linear actuator 120). Other minirhizotrons described herein may be variations of this base design with added functions and hardware.

Figure 4:
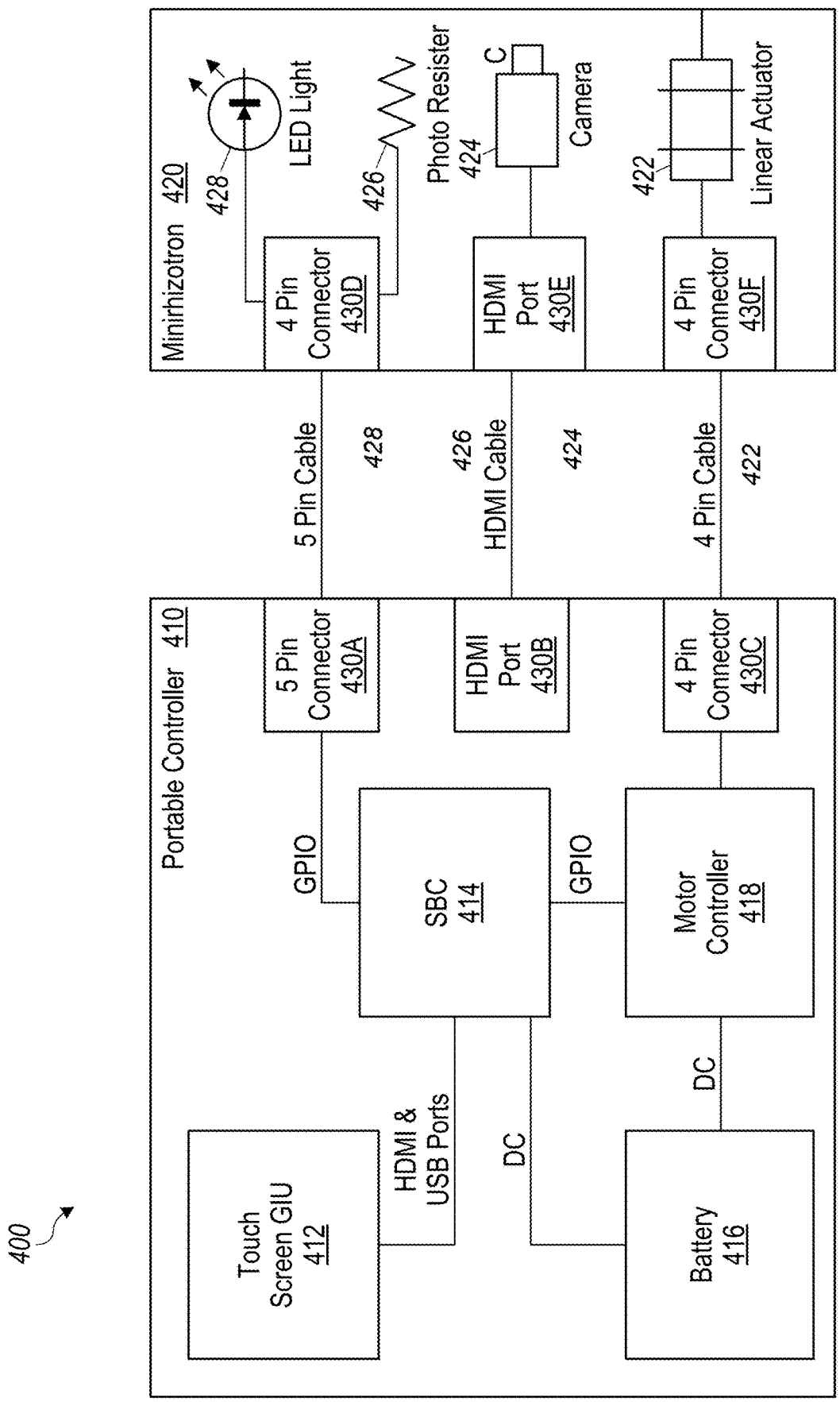
FIG. 4 depicts a schematic of the portable controller and the minirhizotron being designed and packaged as two separate modules.
Figure 5A:
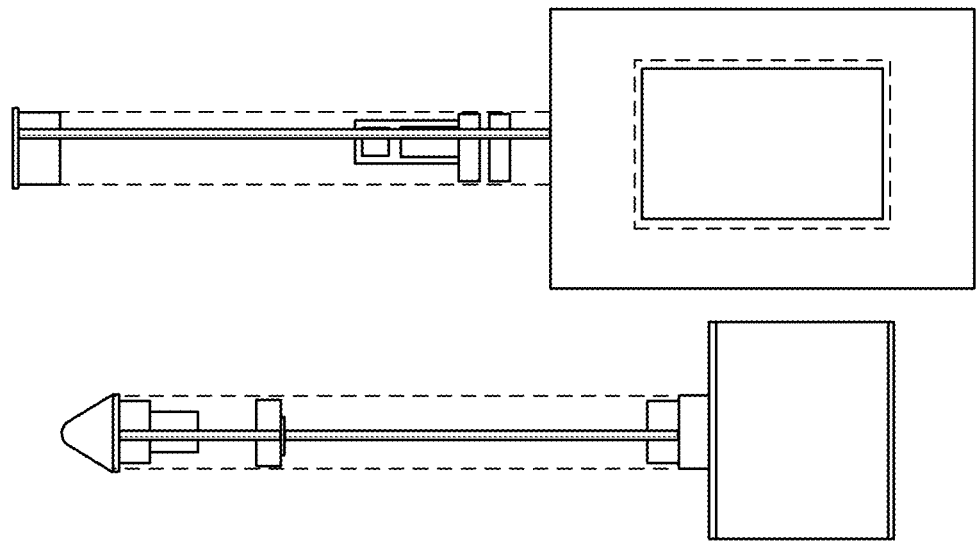
FIG. 5A shows an embodiment of a controller-minirhizotron fully integrated system.
Figure 5B:
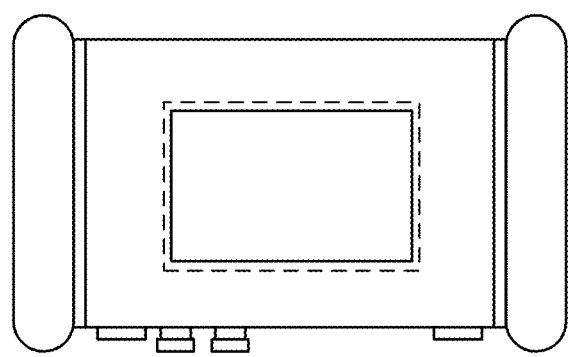
FIG. 5B shows an embodiment of a modular controller and minirhizotron two module design.
Figure 6A:
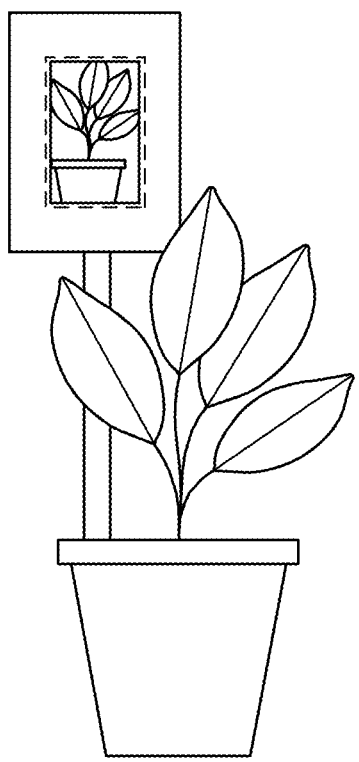
FIG. 6A depicts an illustration of the controller-minirhizotron fully integrated system in use, according to some embodiments.
Figure 6B:
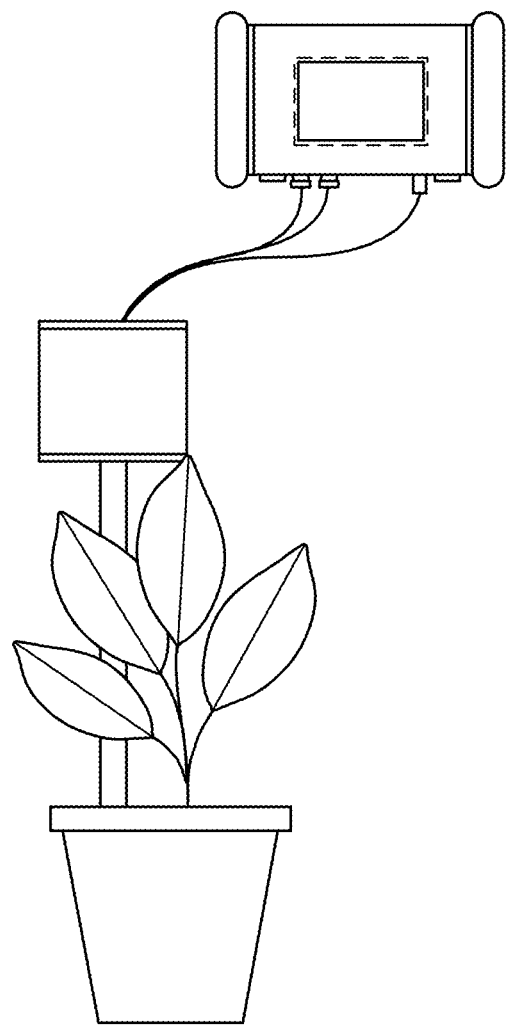
FIG. 6B depicts an illustration of the modular controller and minirhizotron two module design in use, according to some embodiments.

In various embodiments, the portable controller and minirhizotron design is a fully integrated system, allowing users to conduct in-situ diagnosis and obtain results immediately through a controller equipped with a touchscreen-based GUI, an SBC, and a linear actuator controller. FIG. 4 depicts a schematic of the portable controller and the minirhizotron being designed and packaged as two separate modules. FIG. 5A shows an embodiment of a controller-minirhizotron fully integrated system 500. FIG. 5B shows an embodiment of a modular controller and minirhizotron two module design system that includes portable controller 410 and minirhizotron device 420. FIG. 6A depicts an illustration of the controller-minirhizotron fully integrated system 50 in use, according to some embodiments. FIG. 6B depicts an illustration of portable controller 410 and minirhizotron device 420 two module design in use, according to some embodiments.

In the illustrated embodiment of FIG. 4, minirhizotron system 400 includes portable controller 410 and minirhizotron device 420. Portable controller 410 includes touch screen GUI 412, SBC 414, battery 416, and motor controller 418. Minirhizotron device 420 includes linear actuator 422, camera 424, photoresistor 426, and LED light 428. Various connectors 430A-F may be used to connect components in portable controller 410 to components in minirhizotron device 420, as shown in FIG. 4. In some embodiments, the connectors are connected with cables (e.g., a 5 pin cable, a 4 pin cable, or an HDMI cable, as shown).

To perform a test, a user will first insert the minirhizotron into the soil at the location of interest (e.g., as shown in FIGS. 6A and 6B) and then start the software application to perform the test. In certain embodiments, the tube is placed vertically in the soil near the plant root. The first step is to position the camera module at the top of the transparent tube. In some embodiments, a photoresistor (e.g., photoresistor 426) is used to control the initial position of the base of the camera module. Once the positioning process is completed, the image-taking process starts, and images of objects within the camera's viewport will be taken and stored as an image file. Driven by the linear actuator (via the motor controller), the camera will be moved to the next position, and a new image will be taken and saved until the camera reaches the bottom of the transparent tube, completing the process.

Figure 7:
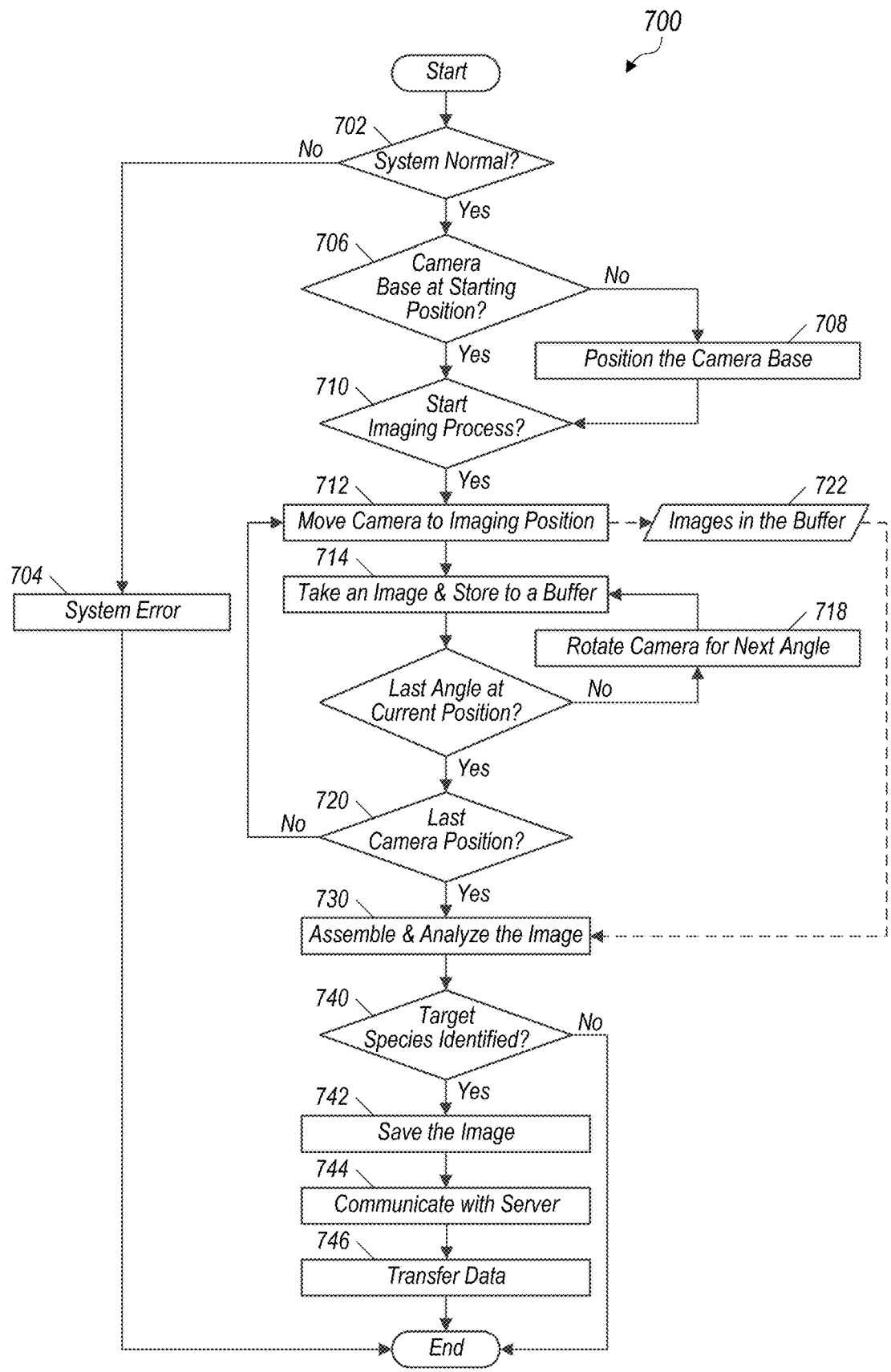
FIG. 7 is a flowchart illustrating an operation sequence of the minirhizotron, according to some embodiments.

FIG. 7 is a flowchart illustrating an operation sequence of the minirhizotron, according to some embodiments. The "Start" of method 700 begins with a "System Normal?" check in 702. If the system is not normal "No", then the system is in error in 704 and no further operation continues. If the system is normal, then it is determined if the camera base is at the starting position in 706. If "no", then the camera is positioned at the base in 708. If "yes", then imaging processing is started in 710. The camera is moved to an imaging position in 712. The imaging position may be a specified depth in the tube (e.g., tube 110) of the minirhizotron device. In 714, images are taken at the position and stored in a buffer. In some embodiments, images are taken using illumination from an LED light (e.g., LED light 428). The LED light illumination may, for instance, illuminate the soil for taking the images.

In 716, it is determined if the camera is at the last angle for the position. If "no", then the camera is rotated to the next angle in 718 and another image taken in 714 at the current camera position. If "yes", then it is determined whether the camera is in the last camera position in 720. If "yes", then the image capture process is complete and method 700 moves to assembly and analysis of images in 730. If "no", then the camera is moved to a new position in 712 (e.g., another specified depth in the tube) and the process repeats accordingly. Images may be stored in buffer 722 until the last camera position (e.g., last specified depth) and last camera angle are completed during the image capture process in steps 712-720.

After images are captured at all the camera positions (e.g., all the specified depths) and at all camera angles, the images stored in buffer 722 are provided for assembly and analysis at 730. Assembly and analysis may include, for example, assembly of all the images into a single panoramic image and various analysis of image properties. In 740, identification of the target species may be determined. If "no" then the process ends. If "yes", then the image may be saved in 742 and communication with the server in 744 may be followed by transfer of image data in 746.

Figure 8:
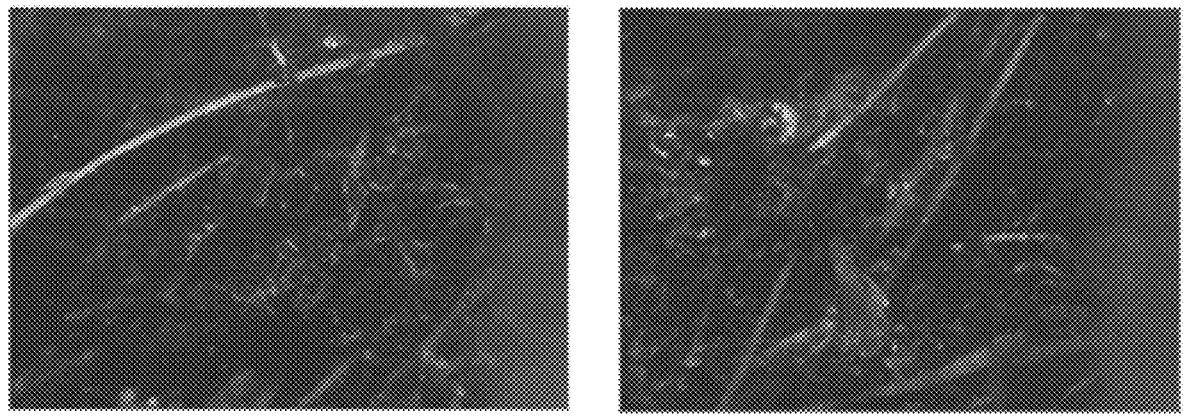
FIG. 8 depicts photographs of root systems in healthy tomato plants.
Figure 9:
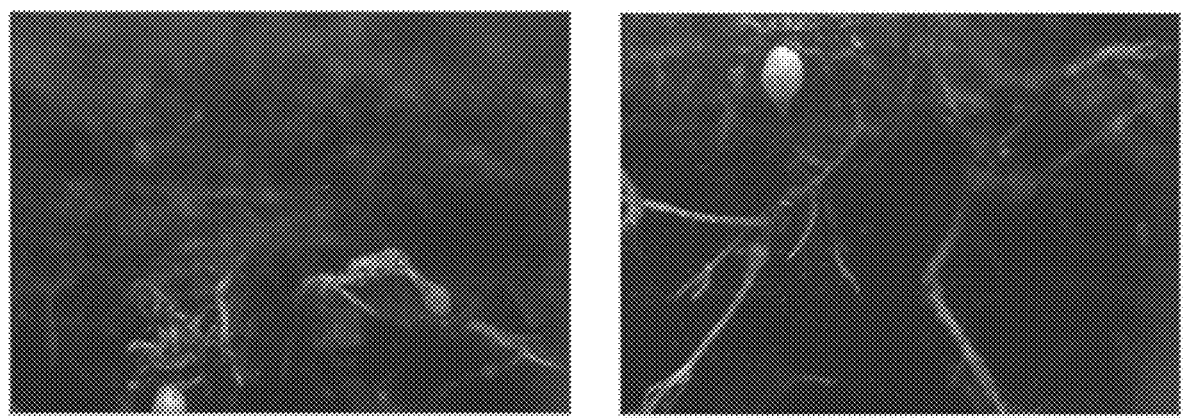
FIG. 9 depicts photographs of root systems of gall-forming nematode-infected tomato plants.

As an example, photographs of root systems in healthy tomato plants are shown in FIG. 8. Photographs of root systems of gall-forming nematode-infected tomato plants are shown in FIG. 9 for comparison showing galls 900 on the infected tomato plants.

In various embodiments, a field-deployable minirhizotron design integrates a PV (photovoltaic) solar power system, a wireless communication module via a Wi-Fi or GSM network, an SBC, a motor controller, a cloud image file storage, and a web browser-based GUI (such as shown in FIG. 4) into a self-sustainable system. The intended application of the device may be for long-term deployment in the field for an extended period of testing and monitoring without the need to travel to the site. In some embodiments, a field-deployable minirhizotron design eliminates the touchscreen in the controller-minirhizotron design, and all operations are performed remotely through a web browser-based GUI. Multiple minirhizotron devices deployed at different physical locations can also be networked, and an authorized user can access and operate them through the web browser-based GUI remotely. All images and results can also be transferred and stored in the cloud.

In various embodiments, to use the minirhizotron device system, an authorized user establishes a connection and gains access to a selected device deployed in the field. The rest of the operations is the same as the controller-based (e.g., touchscreen) minirhizotron design (e.g., the operations described for method 700 shown in FIG. 7). When the image-taking process is completed, all images will be stored locally on the device and transferred to a selected cloud storage space. The user can access these images on the cloud for further image analysis and processing to detect gall-forming nematodes. The device will be available for another user once the current user logs out of it.

Figure 10:
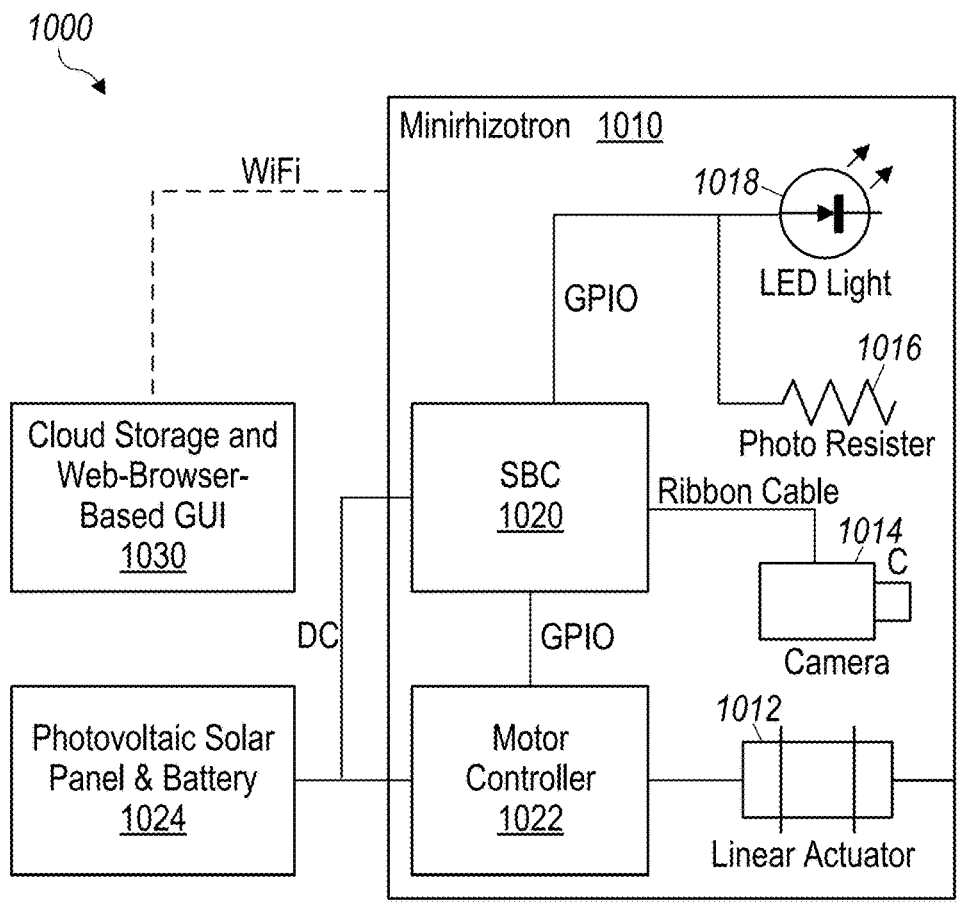
FIG. 10 depicts a schematic of a field-deployable minirhizotron device, according to some embodiments.
Figure 11:
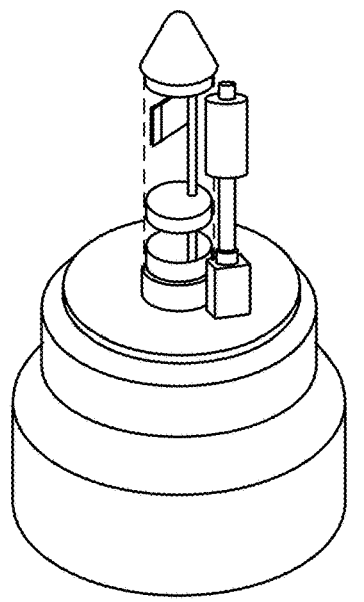
FIG. 11 depicts an illustration of a field-deployable minirhizotron device, according to some embodiments.
Figure 12:
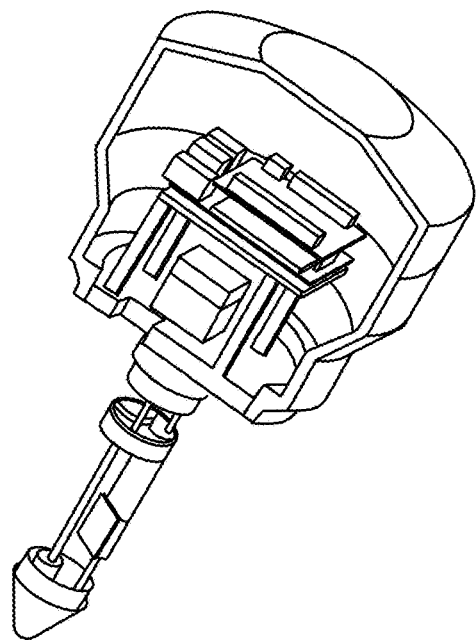
FIG. 12 depicts a cutout illustration of a field-deployable minirhizotron device, according to some embodiments.
Figure 13:
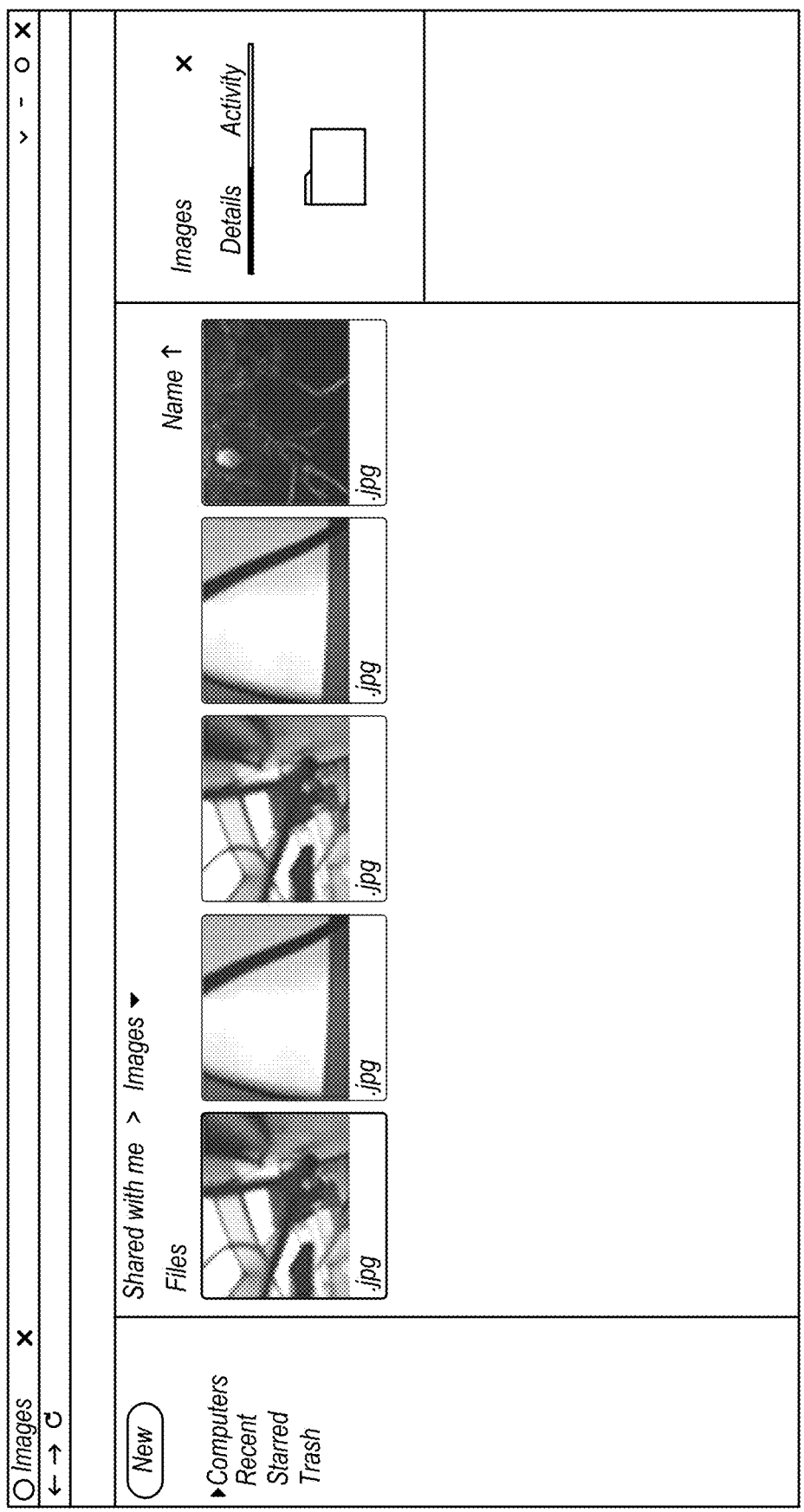
FIG. 13 depicts an example of a web browser-based GUI accessing sample images stored in a cloud drive, according to some embodiments.
Figure 14:
FIG. 14 depicts an example of the GUI displaying a sample image, according to some embodiments

FIG. 10 depicts a schematic of a field-deployable minirhizotron device, according to some embodiments. FIG. 11 depicts an illustration of a field-deployable minirhizotron device, according to some embodiments. FIG. 12 depicts a cutout illustration of a field-deployable minirhizotron device, according to some embodiments. FIG. 13 depicts an example of a web browser-based GUI accessing sample images stored in a cloud drive, according to some embodiments. FIG. 14 depicts an example of the GUI displaying a sample image, according to some embodiments.

In the illustrated embodiment of FIG. 10, minirhizotron system 1000 includes minirhizotron device 1010. Minirhizotron device 1010 includes linear actuator 1012, camera 1014, photoresistor 1016, and LED light 1018 along with SBC 1020 and motor controller 1022. LED light 1018 and photoresistor 1016 may be coupled to SBC 1020 through a general purpose input/output (GPIO) connection. Camera 1014 may be coupled to SBC 1020 through a ribbon cable. Linear actuator 1012 may be coupled directly to motor controller 1022 for operation of the linear actuator. The coupling may be any type of suitable connection (e.g., a two-wire DC motor connection).

In certain embodiments, SBC 1020 and motor controller 1022 are coupled to photovoltaic device 1024, which provides power to minirhizotron device 1010. Photovoltaic device 1024 may be, for example, a solar panel and corresponding battery for storage and supply of energy derived from the solar panel. Photovoltaic device 1024 may be coupled to SBC 1020 and motor controller 1022 through a direct current (DC) connection. In various embodiments, minirhizotron device 1010 includes wireless communication devices capable of communication to a remote processing device such as cloud storage and web browser-based GUI 1030.

In various embodiments, image processing algorithms are implemented to detect and identify suspected nematodes in images captured by the devices described herein. For instance, a plant may have a gall-forming nematode infection if it presents bright spherical galls attached to the host plant root system (such as shown in FIG. 9). With the disclosed minirhizotron devices, a set of root images of plants' roots can be obtained and then analyzed to detect these bright and round-shaped objects representing suspected gall-forming nematodes using image processing algorithms. If such objects exist, the image processing algorithms may report a positive identification and present an image with the detected suspected galls highlighted for further review and tests using molecular techniques.

In certain embodiments, the camera in the transparent tube of the minirhizotron devices may be capable of only taking images representing a particular part of the targeted plant's root since it has a limited view angle. Accordingly, multiple images may need to be taken when the camera is positioned at different locations in the tube (e.g., multiple images at multiple angles). After these images are taken, it may be necessary to "assemble" the images into a combined image for a complete view of the root. Image stitching is an example of one process in which multiple images of the same object with certain overlaps are combined to produce a seamless panoramic image.

Image segmentation is the process of identifying critical parts of an image by some characteristics and then selecting and isolating them. Plant root systems appear to have unique features in color and geometry, allowing isolation of a particular color and shape in images for detection purposes. Accordingly, various algorithms may be developed that process the stitched panoramic image and identify potential galls attached to the plant root system.

In certain embodiments, the images collected by the camera are stitched together to form a unifying panoramic. Subsequently, the panoramic image is converted from the RGB to the HSV color space to select saturation and value above a specified threshold to isolate regions in the color range representing the targeted galls. An additional pass may be performed to remove segments of the image that conform to a line representing plant roots and subsequently filter them out. At the end of this process, a collection of bright round shapes that are suspected targets satisfies positive detection criteria. If detection occurs, the masks are edge detected, expanded, and overlaid onto the image for further review (e.g., review by a user).

Figure 15:
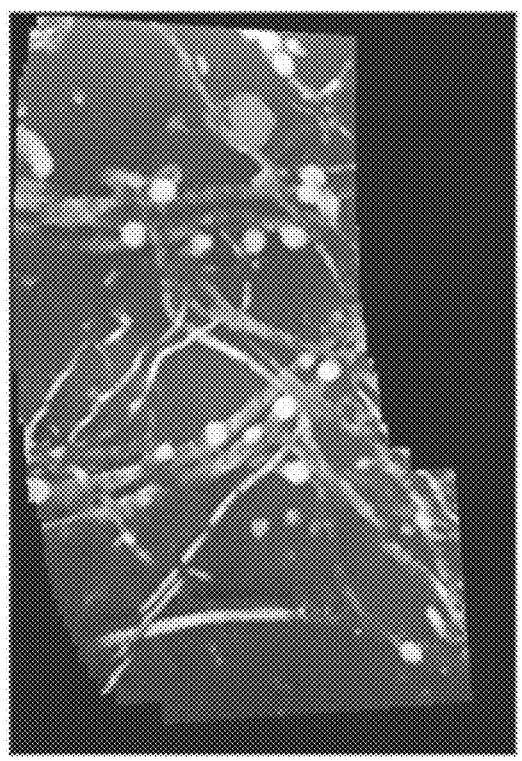
FIG. 15 illustrates a sample panoramic image obtained by applying the image stitching algorithms based on 36 images collected by a probe's camera in a lab environment.
Figure 16:
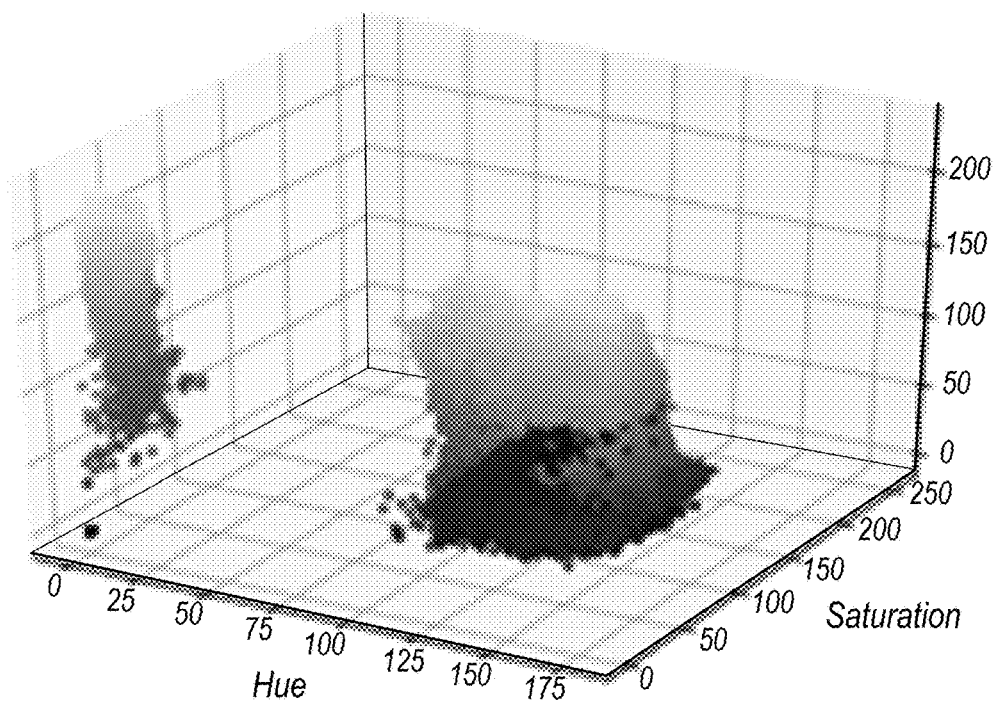
FIG. 16 shows the distribution of color in the HSV color space for the images shown in FIG. 15 after being converted from RGB color space.
Figure 17:
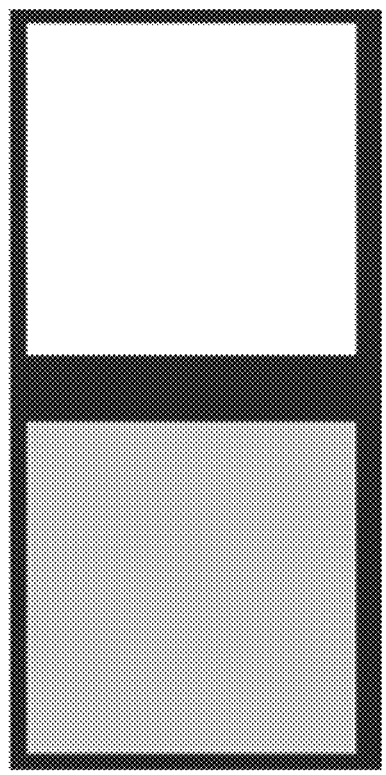
FIG. 17 illustrates an identified color range from left to right.

FIG. 15 illustrates a sample panoramic image obtained by applying image stitching algorithms based on multiple images (e.g., thirty six images) collected by a probe's camera in a lab environment. FIG. 16 shows the distribution of color in the HSV (hue, saturation, value) color space for the images shown in FIG. 15 after being converted from RGB color space. The color space offers the identified color range shown in FIG. 17 from left to right. According to FIG. 16, several poles are spiking into the 150 to 255 value range. The saturation values appear meaningful in the range from 0 to 30, and the hue value varies significantly and may thus be ignored.

Figure 18:
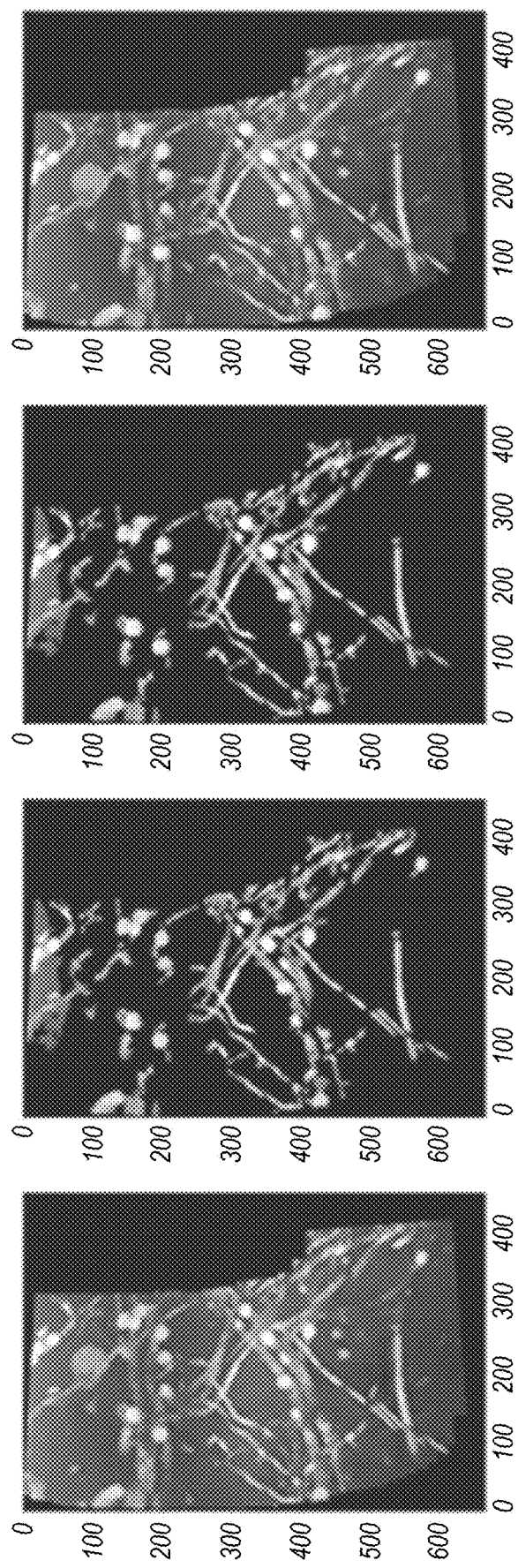
FIG. 18 illustrates the panoramic images with suspected cyst nematode locations highlighted.
Figure 19:
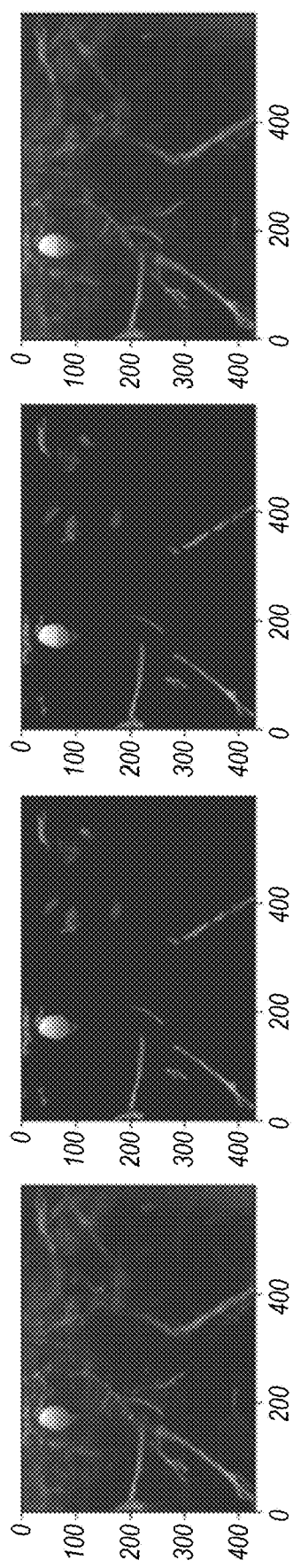
FIG. 19 illustrates the application of the algorithm to identify the cyst nematode.

Once the range has been selected, a mask may be generated over the image to identify all regions which fall into this range. The mask may then be passed through a filter to remove regions that are too linear as determined by the aspect ratio of each region and the percentage of the region occupied by the object contained within to eliminate the mistakenly identified plant roots. A final image with the highlighted suspected targets may be constructed based on these analyses. FIG. 18 illustrates example panoramic images with suspected cyst nematode locations highlighted. FIG. 19 illustrates an example application of the image algorithms to identify the cyst nematode shown in FIG. 18.

Figure 20:
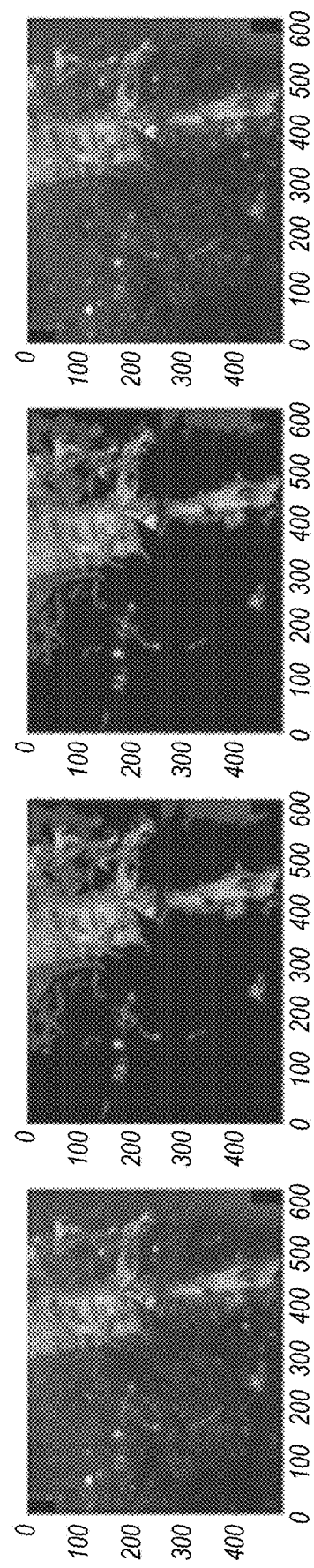
FIG. 20 illustrates the results of another test with higher resolution.

FIG. 20 illustrates the results of another application of image algorithms to different panoramic images with a higher resolution than FIG. 19.

Example Methods

FIG. 21 is a flow diagram illustrating a method for identifying portions of a plant root, according to some embodiments. The method shown in FIG. 21 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system, such as computing device 2210, described below.

At 2102, in the illustrated embodiment, a camera module positioned in a transparent tube is moved to a first specified depth in the transparent tube with a linear actuator, wherein the transparent tube is positioned in soil near a root of a plant.

At 2104, in the illustrated embodiment, multiple images of the plant root at the first specified depth are captured where the multiple images include images captured at multiple angles relative to the plant root.

At 2106, in the illustrated embodiment, the images captured at the first specified depth are stored in a memory coupled to the camera module.

At 2108, in the illustrated embodiment, the camera module is moved to a second specified depth in the transparent tube with the linear actuator.

At 2110, in the illustrated embodiment, multiple images of the plant root at the second specified depth are captured where the multiple images include images captured at multiple angles relative to the plant root.

At 2112, in the illustrated embodiment, the captured images are assembled into a panoramic image of the environment surrounding the transparent tube.

At 2114, in the illustrated embodiment, portions of the plant root in the panoramic image are identified.

Example Computer System

Figure 22:
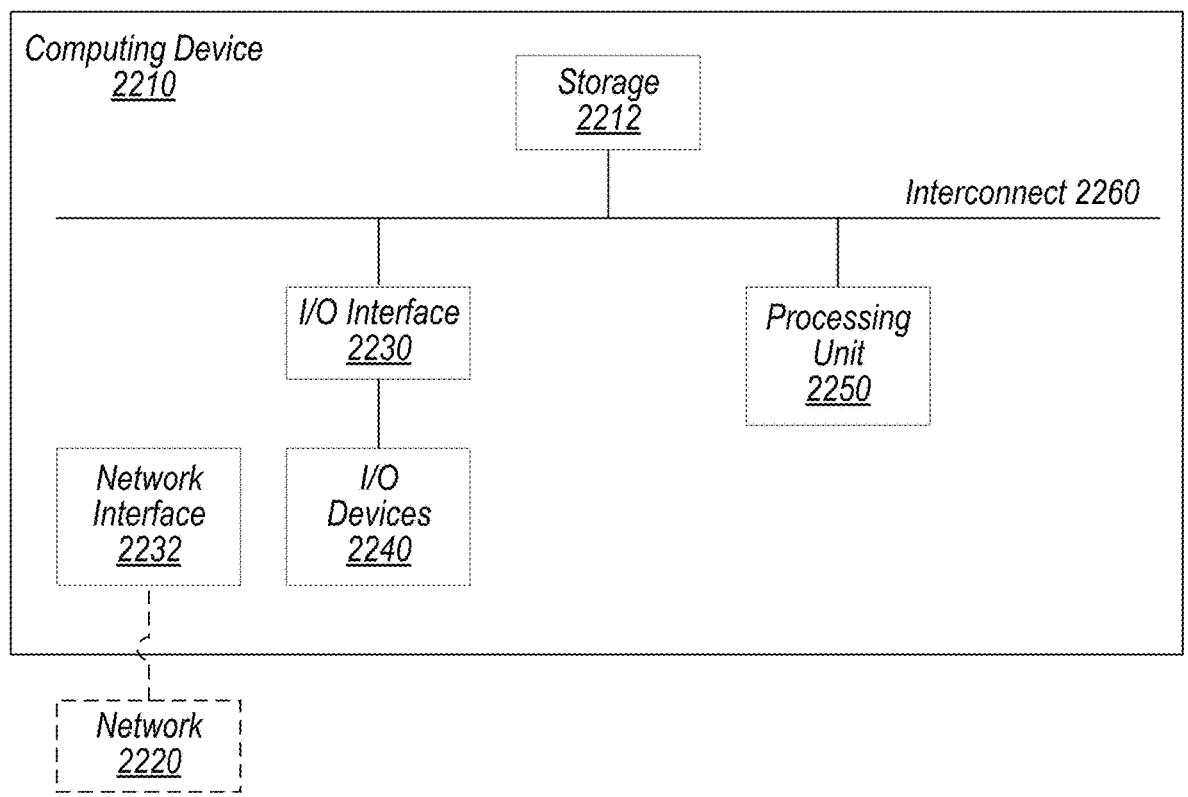
FIG. 22 is a block diagram of one embodiment of a computer system.

Turning now to FIG. 22, a block diagram of one embodiment of computing device (which may also be referred to as a computing system) 2210 is depicted. Computing device 2210 may be used to implement various portions of this disclosure. Computing device 2210 may be any suitable type of device, including, but not limited to, a personal computer system, desktop computer, laptop or notebook computer, mainframe computer system, web server, workstation, or network computer. As shown, computing device 2210 includes processing unit 2250, storage 2212, and input/output (I/O) interface 2230 coupled via an interconnect 2260 (e.g., a system bus). I/O interface 2230 may be coupled to one or more I/O devices 2240. Computing device 2210 further includes network interface 2232, which may be coupled to network 2220 for communications with, for example, other computing devices.

In various embodiments, processing unit 2250 includes one or more processors. In some embodiments, processing unit 2250 includes one or more coprocessor units. In some embodiments, multiple instances of processing unit 2250 may be coupled to interconnect 2260. Processing unit 2250 (or each processor within 2250) may contain a cache or other form of on-board memory. In some embodiments, processing unit 2250 may be implemented as a general-purpose processing unit, and in other embodiments it may be implemented as a special purpose processing unit (e.g., an ASIC). In general, computing device 2210 is not limited to any particular type of processing unit or processor subsystem.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Storage 2212 is usable by processing unit 2250 (e.g., to store instructions executable by and data used by processing unit 2250). Storage 2212 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage 2212 may consist solely of volatile memory, in one embodiment. Storage 2212 may store program instructions executable by computing device 2210 using processing unit 2250, including program instructions executable to cause computing device 2210 to implement the various techniques disclosed herein.

I/O interface 2230 may represent one or more interfaces and may be any of various types of interfaces configured to couple to and communicate with other devices, according to various embodiments. In one embodiment, I/O interface 2230 is a bridge chip from a front-side to one or more back-side buses. I/O interface 2230 may be coupled to one or more I/O devices 2240 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

It is to be understood the disclosed embodiments are not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise.

Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the disclosed embodiments will be apparent to those skilled in the art in view of this description. Accordingly, this description is to be construed as illustrative only and is for the purpose of teaching those skilled in the art the general manner of carrying out the disclosed embodiments. It is to be understood that the forms of the embodiments shown and described herein are to be taken as examples of embodiments. Elements and materials may be substituted for those illustrated and described herein, parts and processes may be reversed, and certain features of the disclosed embodiments may be utilized independently, all as would be apparent to one skilled in the art after having the benefit of this description of the disclosed embodiments. Changes may be made in the elements described herein without departing from the spirit and scope of the disclosed embodiments.

What is claimed is:

1. A device, comprising:
    a transparent tube configured to be positioned in soil near a plant root;
    a linear actuator positioned in the transparent tube;
    a camera module positioned in the transparent tube and coupled to the linear actuator; and
    circuitry coupled to the camera module and the linear actuator, wherein the circuitry is configured to:
        move the camera module to a first specified depth in the transparent tube with the linear actuator;
        capture multiple images of a soil environment surrounding the transparent tube at the first specified depth, the soil environment including the plant root, wherein the multiple images include images captured at multiple angles relative to the plant root;
        store the images captured at the first specified depth in a memory of the device;
        move the camera module to a second specified depth in the transparent tube with the linear actuator;
        capture multiple images of the soil environment surrounding the transparent tube at the second specified depth, the soil environment including the plant root, wherein the multiple images include images captured at multiple angles relative to the plant root; and
        transfer the captured images to a remote processing device.

2. The device of claim 1, wherein the transparent tube is configured to be positioned vertically in the soil near the plant root.

3. The device of claim 1, further comprising a photoresistor coupled to the camera module, wherein the photoresistor is used to control an initial position of the camera module.

4. The device of claim 1, further comprising an LED light coupled to the camera module, wherein the LED light is configured to illuminate the soil when capturing images by the camera module.

5. The device of claim 1, further comprising a controller including the circuitry coupled to the linear actuator and the camera module.

6. The device of claim 5, wherein the controller is remotely positioned from the transparent tube.

7. The device of claim 5, wherein the controller is attached to the transparent tube.

8. The device of claim 5, wherein the controller includes a wireless transmitter, the wireless transmitter being configured to transfer the captured images to the remote processing device.

9. The device of claim 1, wherein the depth of the camera module in the transparent tube is determined by a position of the linear actuator.

10. The device of claim 1, further comprising a battery coupled to the camera module and the linear actuator.

11. The device of claim 1, further comprising a photovoltaic power source coupled to the camera module and the linear actuator.

12. A system, comprising:
    a computer processor comprising a memory;
    a minirhizotron device, comprising:
        a transparent tube configured to be positioned in soil near a plant root;
        a linear actuator positioned in the transparent tube;
        a camera module positioned in the transparent tube and coupled to the linear actuator; and
        circuitry coupled to the camera module and the linear actuator, wherein the circuitry is configured to:
            move the camera module to a first specified depth in the transparent tube with the linear actuator;
            capture multiple images of a soil environment surrounding the transparent tube at the first specified depth, the soil environment including the plant root, wherein the multiple images include images captured at multiple angles relative to the plant root;
            store the images captured at the first specified depth in a memory of the device;
            move the camera module to a second specified depth in the transparent tube with the linear actuator;
            capture multiple images of the soil environment surrounding the transparent tube at the second specified depth, the soil environment including the plant root, wherein the multiple images include images captured at multiple angles relative to the plant root; and
            transfer the captured images to the computer processor;
    wherein the computer processor is configured to:
        receive the captured images from the circuitry coupled to the camera module and the linear actuator;
        assemble the captured images into a panoramic image of the soil environment surrounding the transparent tube; and
        identify portions of the plant root in the panoramic image.

13. The system of claim 12, wherein the computer processor is configured to assemble the captured images into the panoramic image by stitching the captured images together into a single image with certain overlaps between the captured images.

14. The system of claim 12, wherein the computer processor is configured to identify the portions of the plant root to identify whether potential galls are attached to the plant root.

15. The system of claim 12, wherein the computer processor is configured to identify the portions of the plant root based on image segmentation where the computer processor identifies the portions of the plant root based on characteristics of the portions and isolates the portions.

16. A method, comprising:
- moving a camera module positioned in a transparent tube to a first specified depth in the transparent tube with a linear actuator, wherein the transparent tube is positioned in soil near a root of a plant;
- capturing multiple images of the plant root at the first specified depth, wherein the multiple images include images captured at multiple angles relative to the plant root;
- storing the images captured at the first specified depth in a memory coupled to the camera module;
- moving the camera module to a second specified depth in the transparent tube with the linear actuator;
- capturing multiple images of the plant root at the second specified depth, wherein the multiple images include images captured at multiple angles relative to the plant root;
- assembling the captured images into a panoramic image of a soil environment surrounding the transparent tube; and
- identifying portions of the plant root in the panoramic image.

17. The method of claim 16, further comprising assembling the captured images into the panoramic image by stitching the captured images together into a single image with certain overlaps between the captured images.

18. The method of claim 16, further comprising identifying the portions of the plant root to identify whether potential galls are attached to the plant root.

19. The method of claim 16, further comprising identifying the portions of the plant root based on image segmentation, wherein the portions of the plant root are identified based on characteristics of the portions and isolating the portions.

20. The method of claim 16, further comprising transferring, by a computer processor coupled to the memory and the camera module, the captured images to a remote computer processor, wherein the remote computer process assembles the captured images into the panoramic image and identifies the portions of the plant root in the panoramic image.

* * * * *